United States Patent [19]

Evans et al.

[11] Patent Number: 4,779,496
[45] Date of Patent: Oct. 25, 1988

[54] TUBE CUTTING APPARATUS AND METHOD

[75] Inventors: David M. Evans, Plum Borough; Clark B. Candee, Penn Hills, both of Pa.

[73] Assignee: Westinghouse Electric Corp., Pittsburgh, Pa.

[21] Appl. No.: 842,563

[22] Filed: Mar. 21, 1986

[51] Int. Cl.$^4$ ............................................. B23D 21/14
[52] U.S. Cl. ........................................ 82/82; 30/103; 83/54; 83/185; 83/187; 82/1.2
[58] Field of Search ............... 83/54, 185, 187; 82/82; 408/83, 127; 30/103; 15/104.08, 104.09; 29/76

[56] References Cited

U.S. PATENT DOCUMENTS

| | | | |
|---|---|---|---|
| 2,942,092 | 6/1960 | Cammann | 30/103 X |
| 3,859,877 | 1/1975 | Sherer et al. | 82/82 |
| 4,434,815 | 3/1984 | Flaherty et al. | 408/83 X |
| 4,601,223 | 7/1986 | Choby | 82/82 |

Primary Examiner—Donald R. Schran

[57] ABSTRACT

An improved tube cutting apparatus and method for cutting through the inside of a metallic tube is disclosed herein. The apparatus generally comprises a support assembly which is slidably insertable within a tube, a flail tube cutting head connected to a short flexible shaft, and a linking shaft rotatably mounted within the support assembly for connecting the short flexible shaft of the cutting head to a longer flexible drive shaft. The center portion of the housing includes a mandrel circumscribed by a selectively expandable resilient bladder for temporarily affixing the support assembly to the inner wall of the tube in order to position the circular blade of the cutting head adjacent to a desired point along the longitudinal axis of the tube. The proximal and distal portions of the linking shaft include coupling assemblies for facilitating blade changes. In order to confine the cutting action of the blade on the cutting head to a thin circle around the inner wall of the tube, the support assembly also includes a thrust bearing that prevents the blade from moving longitudinally during the cutting operation.

23 Claims, 3 Drawing Sheets

TUBE CUTTING APPARATUS AND METHOD

BACKGROUND OF THE INVENTION

1. Field of the Invention

This invention relates to an improved, internal-diameter flail tube cutter which utilizes a resilient bladder to temporarily affix the cutter in a desired position along the longitudinal axis of a tube. It is particularly useful in cutting sample heat exchange tubes from a nuclear steam generator.

2. Description of the Prior Art

Internal-diameter tube cutters are generally known in the prior art. One of the most common types of such cutters includes a pair of opposing blades which are outwardly extendable by means of a cam. In operation, this type of a cutter is slid into the tube to be cut, and the blade-extending cam is forcibly wedged through cam slots in the blades while the cutter is rotated. The cutting action of such cutters is similar to that of an ordinary household can opener, wherein the workpiece is rotated relative to the blade while a steady pressure causes the blade to cut into the wall of the tube.

While such internal-diameter tube cutters provide satisfactory results in many applications, certain problems may arise when tube cutters of this design are used to cut one or more sample heat exchange tubes out of a nuclear steam generator, which is sometimes necessary in order to determine the extent to which the heat exchange tubes are experiencing corrosion. For example, if the internal diameter of the heat exchange tube to be sampled has been dented around the area of the generator support plates, or internally sleeved to prevent a leak condition from arising in the tube, it may not be possible to slide a conventional, internal-diameter tube cutter through the restrictions in the tube caused by either such dents or sleeves. If one attempts to solve this problem by merely reducing the width of such cam-operated tube cutters so they can slide through such restrictions, the mechanical strength of the cutter may be diminished to the point where it breaks down or wears out after a few tube cuts.

Still another problem associated with such cam-operated tube cutters is the relatively long period of time it takes to penetrate the walls of the tube with such a cutter, coupled with the incompatibility with presently known robotic manipulators. This is a particularly acute problem when tube samples are being cut from an on-line nuclear steam generator, where the longer such a tube cutting process requires, the more radiation the maintenance personnel performing such cutting processes are exposed to.

To solve the problems associated with such prior art tube cutters, a flail tube cutter was developed by Mr. Edward Chobey of the Westinghouse Electric Corporation. This flail tube cutter is described and claimed in U.S. patent application Ser. No. 631,371 filed July 16, 1984, the entire specification of which is expressly incorporated herein by reference. This flail tube cutter is generally comprised of an elongated, substantially cylindrical cutting head which is circumscribed at a point near its top end by a shallow, tapered cutting blade. This cutting blade is serrated at one point in order to define a pair of cutting teeth. The bottom end of the cutting head is connected to a flexible, high-speed drive shaft. Like a train with a partially flattened wheel, the sharp edges defined by the serration prevent any opportunity for a smooth, wheel-to-wheel engagement between the circular cutting blade and the inside wall of the tube. The end result is that the high-speed, flexible shaft whips and flails the cutting head and its shallow, serrated blade against the inner walls of the tube with sufficient force to create a series of overlapping nicks which eventually become overlapping perforations as the tube is finally cut. The cutting head and blade can be easily fabricated with a sufficiently small diameter so that the cutting head and its flexible drive shaft are easily inserted into the open end of a tube and snaked to any desired position along its longitudinal axis.

Unfortunately, this flail tube cutter is not without certain limitations. While it does provide a small-diameter cutting head which is capable of cutting completely through the walls of an Inconel ® heat exchange tube in a matter of a few seconds, the squirming of the high-speed, flexible shaft sometimes causes the serrated, circular blade to perforate the tube in a pattern resembling a broad ring, rather than a thin circle. This ring-shaped cutting pattern becomes more pronounced the farther the cutting head and flexible shaft are snaked up the tube toward the top, U-bend portion thereof, since the squirming of the flexible drive shaft worsens with length. The end result is that this flail tube cutter will sometimes produce a jagged cut around the tubve. A neat well-focused cutting pattern is more desirable than a jagged cut, because it minimizes the amount of metallic debris associated with the cut, and renders it easier to withdraw the sample tube through the tubesheet for inspection.

Still another limitation of this prior art flail tube cutter is the fact that it is not designed to be inserted into the open ends of the tubes from the primary side of the generator, where most tube maintenance procedures are carried out. Rather, it is designed to be inserted through an open end of a tube from the secondary side of the generator, after a U-bend section of a tube has been cut out by an external tube cutting tool. Finally, like the cam-type cutter that preceded it, this prior art flail tube cutter is not compatible with known robotic manipulating devices, thereby necessitating the use of a human operator in a radioactive environment.

Clearly, there is a need for an internal diameter tube cutting device having a diameter which is small enough to slide around local obstructions in the tubes, but is capable of quickly, accurately and neatly cutting the tubes at any position along their longitudinal axis. Ideally, such a tube cutter should be usable from both the primary and secondary sides of the generator, simple in construction, positionable within curved as well as straight tubes by means of known robotic manipulators, and capable of remotely cutting these tubes with a minimum amount of operator effort. Finally, it would be desirable if such a cutter were usable in tubes having different diameters, and included some sort of means for quickly and easily changing the blades as they wore out.

SUMMARY OF THE INVENTION

In its broadest sense, the invention is an improved apparatus and method for cutting for conduit such as a tube, which comprises a support assembly which is insertable and slidable within a tube, a cutting means having a blade means which is rotatably connected to the support assembly by a flexible connecting shaft for cutting around the inner wall of the tube by a flailing action, and a means for temporarily affixing the support assembly to the inside surface of the tube in order to position the blade means adjacent to a selected point along the longitudinal axis of the tube. The affixing means may include a selectively expandable member such as a resilient bladder which is selectively expanded into engagement with the inside walls of the tube when a pressurized fluid is introduced therein.

The central portion of the support assembly may include a mandrel for supporting the resilient bladder. In the preferred embodiment, the resilient bladder completely circumscribes the mandrel and is sealingly engaged thereto. The mandrel may include a guide bore for receiving a linking shaft which connects the flexible connecting shaft of the cutting means to a flexible drive shaft. The support assembly may further include a first coupling assembly at its distal end for detachably coupling the cutting means from the linking shaft, as well as a second coupling assembly at its proximal end for detachably coupling a flexible drive shaft to the linking shaft. These coupling assemblies allow the blade means to be easily replaced when replacement becomes necessary. The flexible drive shaft is preferably surrounded by a casing which also acts as a conduit for conducting pressurized fluid to the resilient bladder. This casing is flexible enough to allow the cutter to be inserted into the open ends of heat exchange tubes from the primary side of the generator, yet rigid enough to provide a positioning means for a known robotic manipulator. The guide bore which rotatably mounts the linking shaft within the mandrel may also be used to conduct pressurized fluid to the interior of the expandable bladder. In order to restrict the motion of the flailing blade means to a thin circular path around the inner wall of the tube, the support assembly may include a thrust bearing for preventing longitudinal movement of the blade means during the cutting operation.

The method of the invention generally comprises the steps of positioning the blade means adjacent to a selected point along the longitudinal axis of a tube by a robotic manipulator which inserts and slides the support assembly into the tube by driving the drive shaft casing. The resilient bladder is next expanded into engagement with the inside walls of the tube in order to detachably mount the support assembly at a desired position within the tube. The blade means is then rotated by the drive shaft until it cuts through the walls of the tube. In the preferred process of the invention, the blade means is rotated between about 3,000 and 15,000 rpm. After the cut is complete, the support assembly and cutting means are detached from the inner walls of the tube by discharging the expanding fluid from the bladder. Finally, the support assembly and cutting means are slidably withdrawn from the tube by the robotic manipulator, which retracts the drive shaft casing completely out of the tube.

The invention is particularly useful for cutting through the inside walls of the heat exchange tubes of a nuclear steam generator from the primary side of the generator.

BRIEF DESCRIPTION OF THE SEVERAL FIGURES

DETAILED DESCRIPTION OF THE PREFERRED EMBODIMENT

Figure 2:
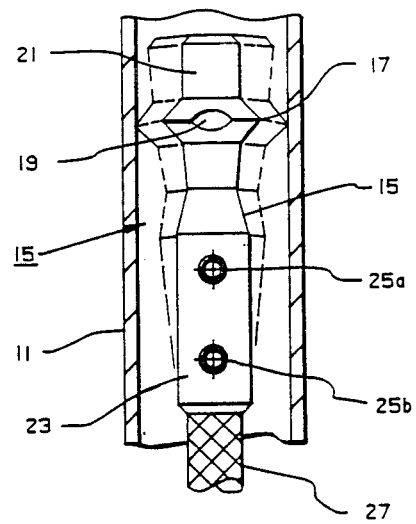
FIG. 2 is a side view of the flail cutting head of the apparatus in operation within the heat exchange tube shown in cross section.
Figure 1:
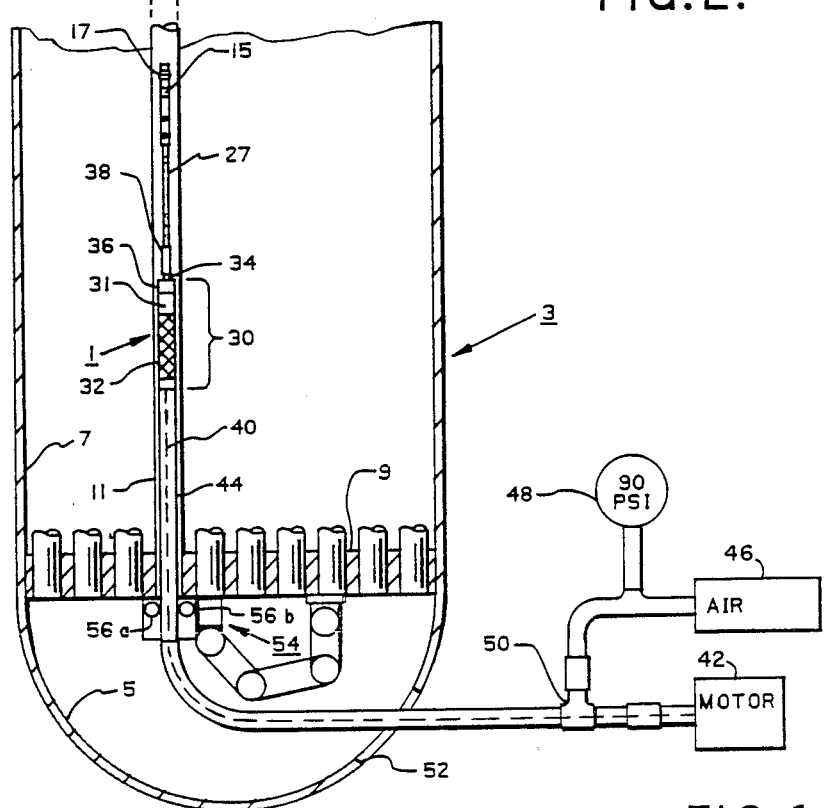
FIG. 1 is a cross-sectional schematic view of the tube cutting apparatus within a heat exchange tube of a nuclear steam generator.

With reference now to FIGS. 1 and 2, wherein like numerals designate like components throughout all the several figures, the improved tube cutting apparatus 1 of the invention is particularly adapted for use within a nuclear steam generator 3. Such generators 3 include a primary side 5, a secondary side 7, and a tubesheet 9 with a plurality of U-shaped tubes 11 mounted therein for hydraulically separating but thermally coupling the primary side 5 to the secondary side 7. Hot, radioactive water from the reactor (not shown) flows into the primary side 5 and into the inlets of the U-shaped tubes 11, where it flows around the U-bends of the tubes 11 and out the outlet ends thereof. A divider plate (not shown) in the primary side 5 hydraulically isolates the inlet ends of the tubes 11 from the outlet ends. Non-radioactive water is admitted into the secondary side 7 in order to receive the heat transferred through the walls of the tubes 11. This water boils, and produces non-radioactive steam which is used to turn the turbines of the electric generators in a power plant (also not shown).

The tube cutting apparatus 1 has a sufficiently small outer diameter throughout its entire longitudinal axis to allow it to be easily inserted and slid to virtually any position within a U-shaped heat exchange tube 11, whether dented or internally sleeved.

At its distal end, the tube cutting apparatus 1 includes a cutting head 15 which is circumscribed by a tapered cutting blade 17 near its top portion 21, as may best be seen in FIG. 2. The cutting blade 17 preferably includes a serration 19 which defines two cutting teeth. The proximal cylindrical portion 23 of the cutting head includes a bore for receiving the upper end of a flexible connecting shaft 27. As used herein the terms "proximal" and "distal" refer to points on the tube cutting apparatus 1 closer or father away from the robotic manipulator 54, respectively. The shaft 27 is secured within this bore by a pair of mounting screws 25a, 25b. The flexible connecting shaft 27 (as well as the flexible drive shaft 40) may be formed from a section of quarter-inch wire wound flexible shafting material which is available from the Flex-Shaft Division of Calco Manufacturing, Inc., located in Addision, Ill. In the preferred embodiment, the flexible connecting shaft 27 is between about 4 and 8 inches long, and is most preferably 6 inches long. While the invention will still be operable if the flexible connecting shaft 27 is longer than 8 inches, the shaft must be short enough so that no squirming occurs during the cutting operation which could significantly widen the area that the cutting blade 17 strikes. The provision of a relatively short flexible connecting shaft 27 between the cutting head 15 and a fixed position support assembly not only minimizes the amount of metallic debris created by the cutting blade 17, but also substantially enhances the cutting effectiveness of the blade 17 by focusing the area that the blade 17 strikes the inner wall of the tube 11 to a thin circle.

Turning back to FIG. 1, the flexible connecting shaft 27 is rotatably driven by and connected to a linking shaft within a support assembly 30 through a distal coupling 38. Generally speaking, the support assembly 30 includes a cylindrical mandrel 31 circumscribed by a sleeve-like resiliently expandable bladder 32. The linking shaft 34 is journalled within a centrally disposed guide bore 65 (see FIG. 3A) which extends completely through the mandrel 31. At the top end of the support assembly 30 is a distal bearing assembly 36 which serves to concentrically and rotatably amount the upper end of the linking shaft 34 to the mandrel 31. At the bottom end of the support assembly 30 is a flexible drive shaft 40 which is ultimately connected to and driven by a drive motor assembly 42. This flexible drive shaft 40 is circumscribed at all points by a shaft casing 44 which serves to conduct pressurized air from a compressed air supply 46 to the resiliently expandable bladder 32, as well as to encase and support this shaft 40. In the preferred embodiment, the compressed air supply 46 includes a pressure gauge 48 for visually displaying the pressure of the air admitted into the shaft casing 44 through a T-shaped air coupling 50. The shaft casing 44 should be flexible enough to be bent upwardly into the open end of a heat exchange tube 11 from a generally horizontal position through a primary manway 52, yet rigid enough so that it may be used as a postioning and support means to slidably position the support assembly 30 and cutting head 15 into a desired position along the longitudinal axis of the tube 11. Such a balance of rigidity and flexibility renders the tube cutting apparatus 1 compatible with a robotic manipulator such as the ROSA (which stands for "remote operated service arm") developed and patented by the Westinghouse Electric Corporation, and example of which is disclosed in U.S. Pat. No. 4,398,110 incorporated herein by reference. When the ROSA is used in connection with the tube cutting apparatus 1 of the invention, extension and retraction rollers 56a, 56b engage against the shaft casing 44 and slidably move both the support assembly 30 and the cutting head 15 throughout the tube 11 until the cutting blade 17 is positioned adjacent a desired point along the longitudinal axis of the tube 11.

Figure 3B:
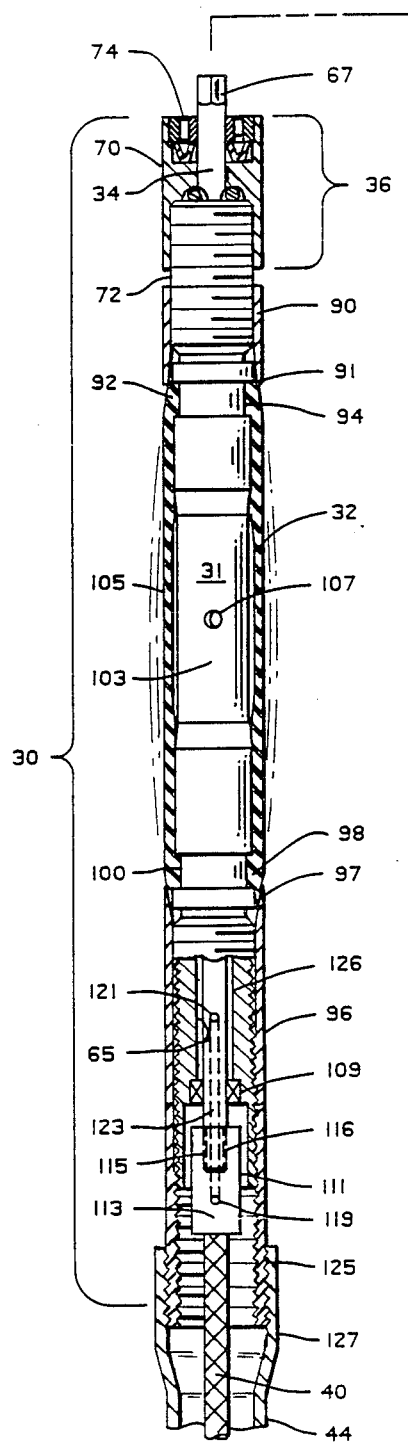
FIG. 3B is an enlarged side cross-sectional view of the distal bearing assembly mounted on top of the support assembly.
Figure 3B:
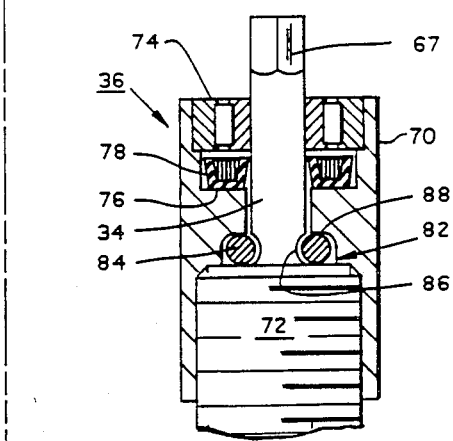
Figure 3A:
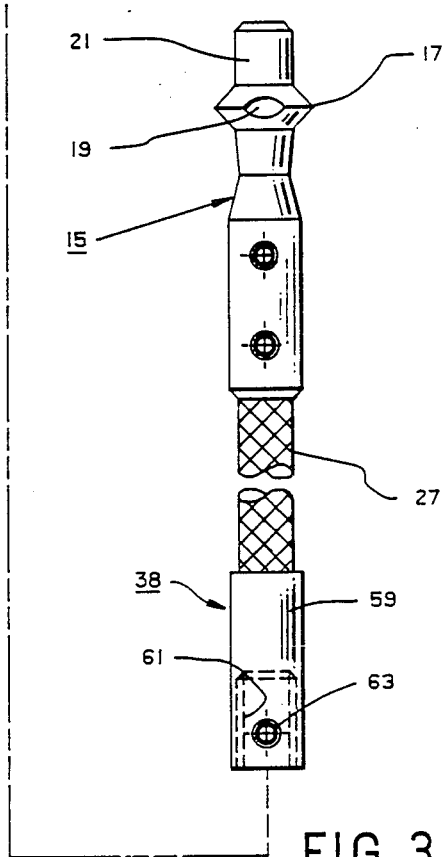
FIG. 3A is a partial cross-sectional side view of the tube cutting apparatus, illustrating how the cutting head and flexible connecting shaft are assembled onto a linking shaft journalled within a support assembly.

Turning now to FIGS. 3A and 3B, the distal coupling 38 which joins the flexible connecting shaft 27 of the cutting head 15 to the linking shaft 34 includes a crimped endpiece 59 whose proximal end is furnished with a square rocket 61 having an Allen retention screw 63. The linking shaft 34 which is journalled within the centrally disposed guidebore 65 extends out of the top and bottom of the mandrel a short distance. Specifically, the distal end 67 of the linking shaft 34 extends out of the upper end of the distal bearing assembly 36, and is squared-off in order that it may be received within the complementary square socket 61 provided in the bottom of the crimped endpiece 59. It is secured therein by the securing screw 63.

With specific reference now to FIG. 3B, the bottom portion of the distal bearing assembly 36 includes a threaded cylindrical skirt 70 which may be screwed over the threaded cylindrical distal end 72 of the mandrel 31. At its top portion, this distal bearing assembly 36 includes a roller bearing 74 for centering and rotatably mounting the linking shaft 34 within the guide bore 65. Located immediately beneath the roller bearing 74 is a gas seal 78. This seal 78 prevents the compressed air which flows through the shaft casing 44 and into the expandable bladder 32 from escaping through the upper end of the guide bore 65. In the preferred embodiment, gas seal 78 is a model No. R231-L-005-FP sealing ring manufactured by the Bal Seal Engineering Company located in Santa Ana, Calif. On its upper side, the gas seal 78 abuts the lower side of the previously described roller bearing 74. On its lower side, it is snugly seated within an annular shoulder 76 provided within the bearing assembly 36. In order to prevent the linking shaft 34 (and the cutting head 15 connected thereto) from moving along the longitudinal axis of the tube during the cutting operation, the distal bearing assembly 36 is provided with a thrust bearing 82. The thrust bearing 82 includes a snap ring 84 which may be seated around a complementary annular groove 86 circumscribing the shaft 34. On its bottom side, the snap ring 84 (which is preferably ovular or rectangular in cross section) abuts the top face of the threaded end 72 of the mandrel 31. Around its upper surface, this snap ring 84 is captured by a complementary annular shoulder 88 in the manner illustrated. While any one of a number of different thrust-bearing arrangements may be used in order to prevent the linking shaft 34 from moving longitudinally during the cutting operation, the use of a thrust bearing employing a snap ring is preferred since it is simple, reliable, and facilitates the assembly and disassembly of the distal bearing assembly 36.

Near the top of the mandrel 31, a threaded distal retaining sleeve 90 lies just below the skirt 70 of the distal bearing assembly 36. Like skirt 70, retaining sleeve 90 is engaged on its inner surface to the threaded end 72 of the mandrel 31. The bottom edge of the distal retaining ring 90 is tapered, and overlies and forcibly squeezes the distal shoulder 92 of the expandable bladder 32 into a complementary annular recess 94 present in the upper end of the mandrel 31 in order to sealingly engage it thereto. The bottom end of the mandrel 31 also includes a proximal retaining ring 96 having a tapered edge 97 on its upper end for similarly squeezing the proximal shoulder 98 of the flexible bladder 32 into another annular recess 100 present within the lower end of the mandrel 31 to seal it thereto. In the preferred embodiment, the expandable bladder is formed from a resilient polyurethane plastic, such as Pellethane ®.

The central section of the mandrel 31 includes a narrowed, cylindrical section 103. This narrowed, cylindrical section 103 is adjacent to a thin-walled section 105 of the expandable bladder 32. This section 103 of the mandrel 31 defines an annular space between the mandrel 31 and the thin-walled section 105 of the expandable bladder 32 which captures compressed air emanating out of an air port 107 in the mandrel 31. This configuration causes the bladder 32 to uniformly expand in a substantially cylindrical pattern (as is indicated in phantom) when compressed air is admitted into the annular space between the bladder 31 and narrowed section 103. Such a cylindrical expansion pattern advantageously allows the expandable bladder 32 to firmly yet gently engage a broad area of the inner walls of a heat exchange tube 11, and thereby to positively secure the positioning assembly 30 (and its attached cutting head 15) at any desired location along the longitudinal axis of the tube without marring or scratching the inner walls. The bladder's ability to firmly secure the cutting apparatus 1 within a tube 11 without scratching or marring its inner walls is a particularly important advantage when the cut tube is used to provide a representative metallurgical sample.

The bottom end of the mandrel 31 includes a threaded coupling ring 125 which screws over the threaded proximal end 126 of the mandrel 31 in abutting relationship with the proximal retaining ring 96. The outer surface of the lower end of this coupling ring 125 is threaded in order that the inner diameter of the distal end 127 of the shaft casing 44 may be screwed thereon in a gas-tight sealing engagement. In its interior, the bottom end of the mandrel 31 includes a proximal roller bearing 109 for journalling the proximal end of the linking shaft 34 within guide bore 65. The proximal end of the linking shaft 34 is in turn coupled to the drive shaft 40 by way of proximal coupling 111. This coupling 111 has air bores 119, 121, and 123 so that compressed air from shaft casing 44 can easily traverse the proximal coupling 111.

Figure 4:
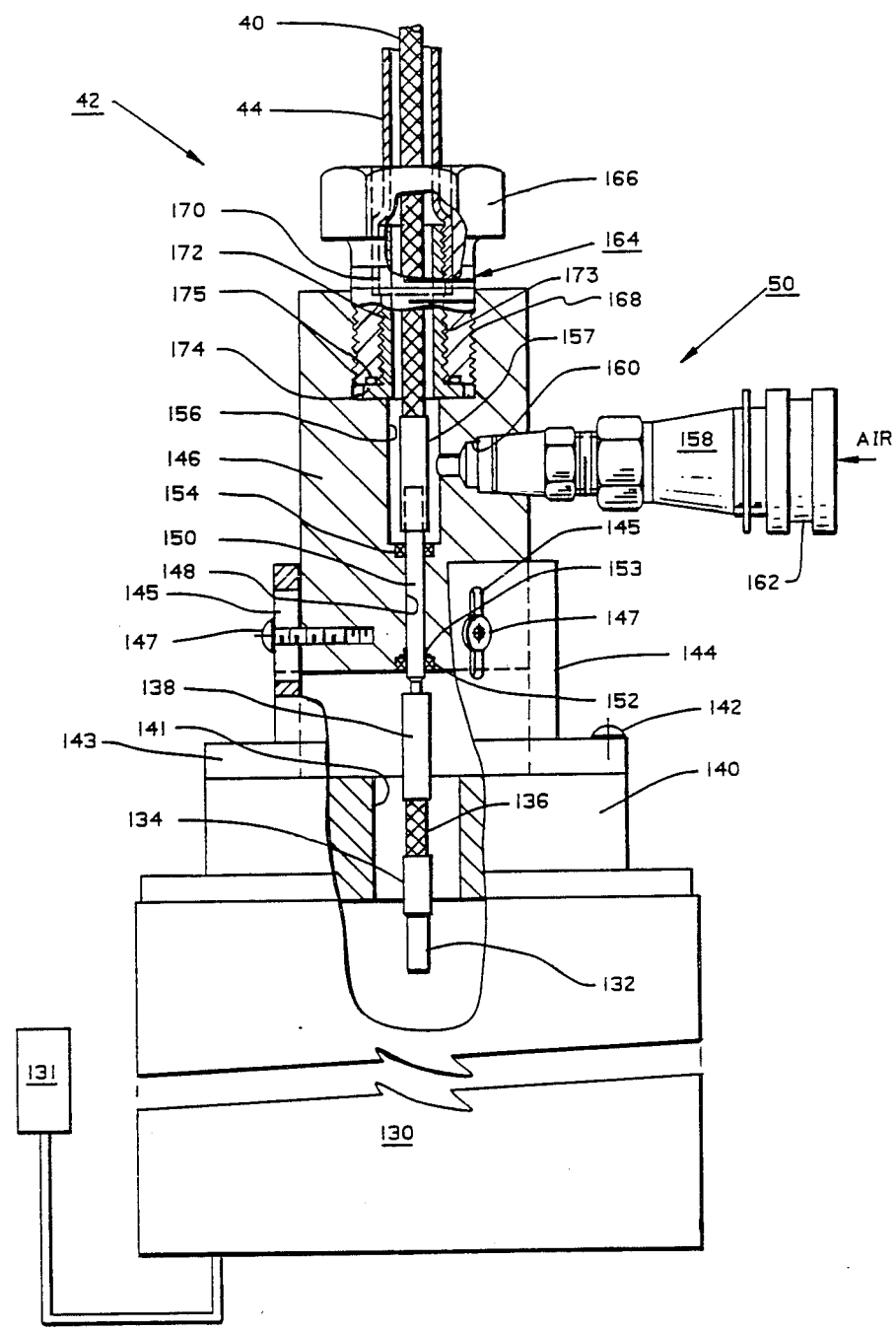
FIG. 4 is a side cross-sectional view of the drive motor assembly which rotates the cutting head of the invention.

With reference now to FIG. 4, the drive motor assembly 42 includes a one and one-half hp electric motor 130 capable of generating at least a 15,000 rpm output. Any one of a number of the type of electric motors used in routing tools may be used. In order that the rotational speed of the output shaft 132 may be varied, a variable speed control 131 is connected between the electrical input of the motor 130, and its power source (not shown). The speed control 131 may be any one of a number of commercially available control circuits that is capable of varying the voltage of the electrical input to the motor 130. As will be appreciated when the process of the invention is described hereinafter, the motor speed control 131 should have the ability to control the rotational speed of the output shaft 132 from between 3,000 to 15,000 rpm.

In the preferred embodiment, the output shaft 132 terminates in a crimped coupling 134 that connects a flexible stub shaft 136 to another crimped coupling 138. Coupling 138 is disposed within a mounting flange 140 having a centrally disposed bore 141, and serves to connect the output end of the flexible stub shaft 136 to a rigid connecting shaft 150. This mounting flange 140 is assembled onto the front face of the electric motor 130 by means of flange bolts 142. The provision of a flexible stub shaft 136 between the output shaft 132 of the motor and the rigid connecting shaft 150 eliminates the need for the mounting flange 140 to be mounted on the face of the motor 130 in a near-perfect concentric relationship, and allows for some "play" to exist between these two shafts.

The mounting flange 140 further includes a circular top plate 143 onto which a junction sleeve 144 is welded in substantially concentric alignment with the bore 141 and flexible stub shaft 136. Junction sleeve 144 includes three bolt slots 145 spaced around its outer diameter in 120° intervals, and receives a cylindrical junction block 146. This junction block 146 is secured onto the sleeve 144 by means of mounting bolts 147 that are inserted through the bolt slots 145 and screwed into threaded bores present in the lower end of the slot 146. Junction block 146 further includes a shaft bore 148 at its lower end for journalling the rigid connecting shaft 150 therein. Roller bearings 152 and 154 are provided at the proximal and distal ends of the connecting shaft 150, respectively, in order to center the shaft 150 within the bore 148 and to rotatably mount it therein with a minimum of friction. Additionally, a gas seal 153 is provided at the proximal end of the bore 148 just above the roller bearing 152 in order to prevent compressed air entering gas nipple 158 from escaping to the outer atmosphere through the bolt slots 145.

Just above the upper end of the shaft bore 148 is a larger diameter gas conducting bore 156. Like the shaft bore 148, bore 156 is concentrically oriented along the longitudinal axis of the cylindrical junction block 146. The diameter of the gas conducting bore 156 is preferably large enough to receive a crimped coupling 157 which connects the distal end of the connecting shaft 150 to the proximal end of the flexible drive shaft 40 while providing an annular, gas conducting space between the outer walls of the coupling 157 and the inner walls of the bore 156. This gas conducting space ultimately communicates with the interior of the shaft casing 44. The junction block 146 includes a lateral gas bore 160 which terminates in the annular space between the crimped coupling 156, and the walls of the bore 156. The outer section of this lateral bore 160 (relative to the radius of the cylindrical junction block 146) is both enlarged and threaded in order to receive the previously mentioned gas nipple 158 therein in sealing engagement. This gas nipple 158 forms the junction 50 between the gas conducting bore 156 which ultimately communicates with the interior of the shaft casing 44, and the source of compressed air 46 illustrated in FIG. 1. To facilitate assembly and disassembly, the gas nipple 158 includes a quick release coupling 162.

The upper end of the cylindrical junction block 146 includes a shaft casing coupler 164 for coupling the shaft casing 44 into the block 146 in a gas-tight engagement. This coupling 164 includes an enlarged coupling bolt 166 which threads into a concentrically arranged bore 168 located at the top end of the junction block 146. The threaded bore 168 is serially connected to the gas-conducting bore 156 in the manner shown. Additionally, the coupling bolt 166 includes another centrally disposed, threaded bore 170 which completely penetrates it along its longitudinal axis. A sealing sleeve 172 having a threaded exterior 173 is screwed into this threaded bore 170, with the proximal end of the drive shaft casing 44 captured therebetween in a gas-tight seal. At its proximal end, the sealing sleeve 172 terminates in a stop flange 174 which abuts the bottom of the coupling bolt 166. Finally, an O-ring 175 is seated within a complementary groove present in the bottom face of the coupling bolt 166 to prevent compressed gas from escaping between the threaded exterior of the sleeve 172, and the threaded interior of the bore 168. During assembly, a silicon-based thread-sealing paste is applied to the threads of the coupling bolt 166 as a further precaution against gas leakage.

The process of the invention may be best understood with reference to FIGS. 1, 2, and 3A. In the first step of the process, the tube cutting apparatus 1 is inserted into the open end of a heat exchange tube 11 selected to provide a sample representation of the metallurgical condition of the heat exchange tubes in a particular portion of the steam generator 3. In order to prevent human operators from being exposed to potentially harmful radiation, the insertion step is preferably implemented by means of a robotic arm such as the ROSA previously alluded to. After insertion, the support assembly 30 and its attached cutting head 15 are next slidably positioned within the tube 11 until the cutting blade 17 of the cutting head 15 is placed adjacent to the desired end of the sample cut. As was previously pointed out, this step can be accomplished by means of drive rollers 56a and 56b which engage and drive the shaft casing upwardly into the tube 11. The shaft casing 44 is preferably selected from a plastic material having a compressive strength great enough to support the support assembly 30 and the cutting head 15 without significantly buckling or sagging. This, in turn, allows the operator of the ROSA to easily infer the position of the blade 17 of the cutting head 15 along the longitudinal axis of the tube 11 by merely noting how many feet of shaft casing 44 have been inserted into the open end of the sample tube 11.

Once the cutting blade 17 has been so positioned, the driving rollers 56a and 56b of the ROSA are deactuated. A solenoid-operated valve (not shown) included within the source of compressed air 46 is then opened in order to allow compressed air of approximately 90 psi to enter the previously described lateral gas port 160 in the junction block 146 of the drive motor assembly 42. This compressed air travels up through the gas conducting bore 156 in the junction block 146, and into the annular space between the drive shaft 40, and the inner wall of the shaft casing 44. From there, it enters the lower air hole 119 in the lower crimp coupling 113 of the positioning assembly 30, where it flows through the centrally disposed air bore 123 located in the distal portion of the linking shaft 34 in order to traverse the proximal bearing 109. The air is next expelled out of the air hole 121 in the linking shaft 34, where it enters the annular space between the linking shaft 34 and the centrally disposed guide bore 65 in the mandrel 31. Ultimately, the compressed air flows out of the air port 107 located in the center part of the mandrel 31 and fills the annular space between the narrow portion of the mandrel 103, and the inner wall of the expandable bladder 32. As was mentioned earlier, the thin-walled configuration of the bladder 32 at its central portion allows the central portion of the bladder 32 to expand in a generally cylindrical pattern against the inner wall of the tube 11 to be cut, as is indicated in phantom.

With the support assembly 30 thus secured within the inner wall of the tube 11, the electric motor 130 of the drive assembly 42 is then actuated. The rotary motion generated by the output shaft 134 of the motor 130 is transmitted through the flexible stub shaft 136, the connecting shaft 150 and thence to the flexible drive shaft 40. The flexible drive shaft 40 then rotates the linking shaft 34 journalled within the mandrel 31, which in turn rotates the flexible connecting shaft 27 to which the cutting head is mounted. The off-center weight distribution of the cutting head 15 caused by the serration 19 in the blade 17 in turn causes the teeth of the blade 17 to whip and flail in a thin circular pattern around the inner wall of the tube 11.

As the blade 17 of the cutting head 15 cuts through the inner wall of the tube 11, the radial extent to which this blade can move relative to the tube 11 is limited by the top 21 of the cutting head 15, as may best be seen in FIG. 2. More importantly, the longitudinal movement of the cutting blade 17 is sharply restricted by the thrust bearing 82 provided within the distal bearing assembly 36. It should be noted that, in order to prevent any such longitudinal blade motion from occurring as a result of the squirming of the connecting flexible shaft 27, the length of the connecting shaft 27 should be relatively short as compared to the drive shaft 40. In the preferred embodiment, such dimensioning translates to between about four and eight inches, with six inches being the preferred length when 0.75 OD Inconel ® tubing is being cut.

In order to minimize the "flairing" of the sample tube on its cut end, the cutting head 15 is rotated between about 3,000 and 15,000 rpm, with 12,000 rpms being the preferred rotational speed. At such rotational speeds, each cut takes approximately two and a half minutes. While faster rpm have been found to result in significantly shorter cutting times, the flailing motion of the cutting head 15 at such speeds can strike the inner walls of the open end of the sample tube 11 hard enough to create a work-hardened flair around its rim. Such a flair interferes with the withdrawal of the tube 11 from nuclear steam generator 39 since both the tube 11 and its flaired end must be drawn out of a bore in the tubesheet 9 which closely surrounds the tube 11. However, such flairing will not occur to any significant extent if the cutting head 15 is rotated at a speed within the aforementioned limits.

After the tube 11 has been cut, the motor 130 of the drive assembly 42 is deactuated, and the air within the expandable bladder 32 vented so that it returns to its initial, non-engaging shape around the mandrel 31. The tube cutter assembly 1 is then withdrawn out of the cut tube 11 by reversing the direction of the drive rollers 56a and 56b of the ROSA. The sample tube is then withdrawn out of the tubesheet 9 by means of a tube pulling apparatus which forms no part of the instant invention.

The provision of a support assembly 30 which is detachably mountable within the inner walls of a tube 11 by means of an expandable bladder 32 allows the tube cutting apparatus 1 to easily and accurately cut such tubes without marring or otherwise damaging the inner walls of the sample tube 11. Additionally, the provision of a thrust bearing 82 in a linking shaft 67 which drives a flail type cutting head 15 through a short flexible connecting shaft 27 provides a flail tube cutter which is capable of cutting the inner wall of a tube 11 in a thin circular pattern.

We claim:

1. An apparatus for cutting a conduit, comprising a substantially rigid support assembly which is insertable within an slidably positionable along the longitudinal axis of said conduit, a shaft means rotatably mounted within the support assembly, a thrust bearing on the distal end of the shaft means, a cutting means connected at one end to the shaft means for cutting around the inside surface of the conduit, and means for temporarily affixing said support assembly to the inside surface of said conduit in order to position said cutting means at a selected point along the longitudinal axis of the conduit including a resilient bladder which frictionally engages the inside surface of the conduit when a pressurized fluid is introduced therein.

2. The apparatus of claim 1, wherein the support assembly includes a coupling means on its distal end for detachably connecting the cutting means to the shaft means.

3. The apparatus of claim 2, wherein said cutting means includes a blade means, and means for restricting the radial extent to which the blade means can move relative to the conduit during the cutting operation.

4. The apparatus of claim 2, wherein said support assembly includes means for restricting the longitudinal extent to which the cutting means can move relative to the conduit during the cutting operation.

5. The apparatus of claim 1, wherein the support assembly includes a coupling means on its proximal end for detachably connecting a drive shaft to said shaft means.

6. The apparatus of claim 1, wherein the support assembly includes a mandrel for supporting said resilient bladder.

7. The apparatus of claim 3, wherein said means for limiting the radial extent to which said blade means can move includes a section of said cutting head which extends above said blade means.

8. The apparatus of claim 5, further including positioning means for remotely slidably positioning said support assembly within a conduit.

9. The apparatus of claim 8, wherein said positioning means includes a casing which surrounds the drive shaft means.

10. An improved apparatus for cutting the inside surface of a tube with a cutting means connected to a shaft means so that said cutting means cuts the tube by a flailing action, comprising:
   (a) a flexible connecting shaft connected to said cutting means and to said shaft means;
   (b) a substantially rigid support assembly connected to said shaft means having a distal end and a proximal end which is insertable within and slidably movable along the longitudinal axis of the tube;
   (c) a pressure operated, selectively expandable member connected to said support assembly for temporarily affixing said support assembly to the inside surface of the tube in order to position said cutting means adjacent to a selected point along the longitudinal axis of the tube, and
   (d) a guide bore within said support assembly for both journalling said shaft means and for conducting a pressurized fluid to said pressure operated, selectively expandable member.

11. The apparatus of claim 10, wherein the support assembly includes a coupling means on its distal end for detachably connecting the cutting means to the shaft means.

12. The apparatus of claim 10, wherein said cutting means includes a blade means, and means for restricting the radial extent to which the blade means can extend relative to the tube during the cutting operation.

13. The apparatus of claim 10, wherein said cutting means includes a blade means, and said shaft means includes means for restricting the longitudinal extent to which the blade means can move relative to the tube during the cutting operation so that said blade means cuts said tube in a narrow circular path in order to minimize the amount of tube cuttings produced by the blade means.

14. An improved apparatus for cutting the inner wall of a tube with a cutting means having a flexible connecting shaft connected to a drive shaft which cuts the tube by a flailing action, comprising:
   (a) a substantially rigid support assembly having a distal and a proximal end which is slidably movable along the longitudinal axis of the tube, and which includes
      (i) a mandrel in its middle portion having a guide bore for journalling a linking shaft which links the flexible shaft of the cutting means to the drive shaft, and for providing a flow path for a pressurized fluid.
      (ii) a coupling means in its distal portion for detachably connecting the linking shaft to the flexible connecting shaft of the cutting means in order to facilitate the replacement of the cutting means,
      (iii) thrust bearing means for preventing the linking shaft from moving along the longitudinal axis of the guide bore during the cutting operation so that the cutting means cuts the inner wall of the tube in a thin circular pattern while producing a minimum amount of tube cuttings, and
      (iv) a coupling means in its proximal portion for detachably connecting the drive shaft to said linking shaft;
   (b) a resiliently expandable bladder circumscribing a portion of the mandrel and mounted thereto in fluid-tight relationship for temporarily affixing said support assembly to the inside surface of the tube in order to position the cutting means adjacent to a selected point along the longitudinal axis of the tube, wherein said expandable bladder communicates with a source of pressurized fluid at least in part through said guide bore in said mandrel, and
   (c) means located at the distal end of said support assembly for both journalling said linking shaft and for creating a fluid-tight seal between said linking shaft and said guide bore so that pressurized fluid introduced into the guide bore will be substantially directed into the expandable bladder.

15. An improved flail cutter for cutting the inner wall of a tube of the type having an elongated cutting head circumscribed by a blade means, and a flexible shaft connected to the cutting head for rotating said cutting head and flailing said blade means against the inner wall of said tube, wherein the improvement comprises a substantially rigid support assembly that is insertable within and slidably positionable along the longitudinal axis of the tube, and which has a linking shaft for coupling the cutting head and a flexible connecting shaft to a drive shaft, and means for detachably mounting said cutting head and flexible connecting shaft at a selected point along the longitudinal axis of said tube.

16. The improved flail cutter of claim 15, wherein said means for detachably mounting said support assembly within said tube includes an expandable member that is selectively expandable into engagement against the inner wall of the tube.

17. The improved flail tube cutter of claim 15, wherein said selectively expandable member includes a resilient bladder which frictionally engages the inside surface of the tube when a pressurized fluid is introduced therein, and disengages said inside surface when said fluid is discharged therefrom.

18. The improved flail tube cutter of claim 15, wherein said support assembly includes means for limiting the longitudinal movement of said cutting head so that said blade means cuts said tube around a thin circular path while producing a minimum amount of tube cuttings.

19. The improved flail tube cutter of claim 15, wherein the length of the flexible connecting shaft is less than about ten times the length of the elongated cutting head.

20. A method for cutting a conduit by means of a cutting device having a substantially rigid support assembly slidably positionable along the longitudinal axis of the conduit, a linking shaft rotatably mounted within the support assembly, a cutting means having a blade means which is connected to one end of the linking shaft for cutting around the inner wall of the conduit, a flexible drive shaft connected to the other end of the linking shaft and surrounded by a flexible, fluid-tight casing, wherein said support assembly includes an expandable bladder which is selectively engageable with the inner surface of the conduit when a pressurized fluid is introduced into the bladder by way of the fluid-tight casing, comprising the steps of:
- (a) positioning the blade means adjacent to a point along the longitudinal axis of the conduit by slidably moving the support assembly of the device along the inside of the conduit by manipulating said casing surrounding the flexible drive shaft;
- (b) fixing said blade means into said position adjacent said point by introducing pressurized fluid into the expandable bladder through the fluid-tight casing until said bladder engages the inner surface of the conduit and secures said support assembly at a desired position within said conduit;
- (c) rotating the blade means by said drive shaft until said blade means cuts through said conduit;
- (d) stopping the rotation of said blade means;
- (e) disengaging said expandable bladder from the inside surface of said conduit by discharging said fluid from said bladder, and
- (f) removing said cutting device from said conduit.

21. The method of claim 20, wherein said cutting means is a flail tube cutter having a substantially cylindrical body which is circumscribed by a blade at a point between its distal and proximal ends, and wherein said blade means is rotated at a speed no greater than about 15,000 rpm to prevent flairing of the cut end of the conduit.

22. A method for cutting a conduit by means of an improved flail tube cutter having an elongated cutting head circumscribed by a blade means, said cutting head being connected to a flexible connecting shaft, a substantially rigid support assembly which includes a linking shaft for couping the flexible connecting shaft to a drive shaft, as well as means for detachably mounting the support assembly, flexible connecting shaft and cutting head within the conduit, comprising the steps of
- (a) positioning the blade means of the cutting head adjacent to a selected point along the longitudinal axis of the conduit by slidably moving the support means, flexible connecting shaft, and cutting head along the longitudinal axis of the conduit;
- (b) detachably mounting the support assembly within the conduit after said blade means is positioned;
- (c) rotating said blade means at a speed no greater than about 15,000 rpm to avoid creating a flair around the cut end of the conduit after said conduit is cut, and
- (d) stopping the rotation of the blade means.

23. The method of claim 22, wherein the blade means is rotated for between about two and three minutes before the rotation of the blade means is stopped.

* * * * *